United States Patent
Rabet et al.

(10) Patent No.: US 10,157,268 B2
(45) Date of Patent: Dec. 18, 2018

(54) RETURN FLOW GUARD USING CONTROL STACK IDENTIFIED BY PROCESSOR REGISTER

(71) Applicant: Microsoft Technology Licensing, LLC, Redmond, WA (US)

(72) Inventors: Jordan Thomas Rabet, Bellevue, WA (US); Kenneth D. Johnson, Bellevue, WA (US); Matthew R. Miller, Seattle, WA (US); Adam M. Zabrocki, Bellevue, WA (US); Shawn Daniel Hoffman, Seattle, WA (US); Landy Wang, Honolulu, HI (US); Yevgeniy M. Bak, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 163 days.

(21) Appl. No.: 15/277,283

(22) Filed: Sep. 27, 2016

(65) Prior Publication Data

US 2018/0088988 A1  Mar. 29, 2018

(51) Int. Cl.
*G06F 9/46* (2006.01)
*G06F 21/00* (2013.01)
*G06F 9/48* (2006.01)

(52) U.S. Cl.
CPC .............. *G06F 21/00* (2013.01); *G06F 9/485* (2013.01)

(58) Field of Classification Search
None
See application file for complete search history.

(56) References Cited

U.S. PATENT DOCUMENTS

| 7,581,089 B1 * | 8/2009 | White | G06F 12/1416 |
| | | | 712/242 |
| 7,660,985 B2 | 2/2010 | Asher et al. | |
| 2004/0103252 A1 | 5/2004 | Lee et al. | |
| 2004/0143721 A1 * | 7/2004 | Pickett | G06F 9/383 |
| | | | 711/217 |
| 2004/0168078 A1 | 8/2004 | Brodley et al. | |
| 2012/0278665 A1 * | 11/2012 | Serebryany | G06F 11/073 |
| | | | 714/53 |

(Continued)

OTHER PUBLICATIONS

Corliss, et al., "Using DISE to Protect Return Addresses from Attack", In Proceedings of ACM SIGARCH Computer Architecture News, vol. 22, Issue 1, Mar. 2005, pp. 65-72.

(Continued)

*Primary Examiner* — Dong U Kim
(74) *Attorney, Agent, or Firm* — Fiala & Weaver P.L.L.C.

(57) ABSTRACT

Each program thread running on a computing device has an associated data stack and control stack. A stack displacement value is generated, which is the difference between the memory address of the base of the data stack and the memory address of the base of the control stack, and is stored in a register of a processor of the computing device that is restricted to operating system kernel use. For each thread on which return flow guard is enabled, prologue and epilogue code is added to each function of the thread (e.g., by a memory manager of the computing device). The data stack and the control stack each store a return address for the function, and when the function completes the epilogue code allows the function to return only if the return addresses on the data stack and the control stack match.

20 Claims, 7 Drawing Sheets

(56) References Cited

U.S. PATENT DOCUMENTS

| | | | |
|---|---|---|---|
| 2014/0380468 A1 | 12/2014 | Gerzon et al. | |
| 2015/0254164 A1 | 9/2015 | Guan et al. | |
| 2015/0302195 A1 | 10/2015 | Acar et al. | |
| 2016/0092676 A1 | 3/2016 | Crowe | |
| 2016/0098556 A1 | 4/2016 | Alharbi et al. | |
| 2016/0171211 A1 | 6/2016 | Chen et al. | |
| 2016/0224784 A1* | 8/2016 | Krishnaswamy | G06F 21/52 |
| 2017/0228535 A1* | 8/2017 | Shanbhogue | G06F 21/52 |
| 2018/0004690 A1* | 1/2018 | Kaminski | G06F 13/18 |

OTHER PUBLICATIONS

Cowan, et al., "Protecting Systems from Stack Smashing Attacks with StackGuard", In Journal of Linux Expo, May 1999, 11 pages.

Roth, et al., "Implicit Buffer Overflow Protection Using Memory Segregation", In Proceedings of the Sixth International Conference on Availability, Reliability and Security, Aug. 22, 2011, pp. 1-8.

Shuo, et al., "Prevent kernel return-oriented programming attacks using hardware virtualization", In Proceedings of the 8th international conference on Information Security Practice and Experience, Apr. 9, 2012, 2 pages.

Dang, et al., "The Performance Cost of Shadow Stacks and Stack Canaries", In Proceedings of the 10th ACM Symposium on Information, Computer and Communications Security, Apr. 14, 2015, pp. 1-12.

"RAP: RIP ROP", Published on: Oct. 24, 2015 Available at: https://pax.grsecurity.net/docs/PaXTeam-H2HC15-RAP-RIP-ROP. pdf.

"Grsecurity", Retrieved on: Sep. 8, 2016 Available at: https://grsecurity.net/rap_faq.php.

\* cited by examiner

RETURN FLOW GUARD USING CONTROL STACK IDENTIFIED BY PROCESSOR REGISTER

BACKGROUND

As computing technology has advanced, our use of computers in our lives has also increased. This increased use of computers has provided many benefits, but is not without its problems. One such problem is that the more computers are used and interact with other computers, the greater the exposure these computers have to attack from malicious users and/or devices. New types of attacks are regularly developed, making protecting against such attacks a difficult problem.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a computing device a data stack and a control stack are both assigned to a program thread. A return address for a function of the program thread, upon entry to the function, is added to the data stack for the program thread, and the return address for the function of the program thread, upon entry to the function, is copied to the control stack for the program thread. A stack displacement value that is a difference between a base of the control stack and a base of the data stack is stored in a processor register of the computing device, the processor register being immutable to programs running on the computing device in user mode. In response to the return address on the data stack for the program thread matching a return address on the control stack for the program thread, execution of the program thread resumes at the return address upon completion of the function.

In accordance with one or more aspects, in a computing device, upon entry to a function of a program thread, a return address for the function is added to a control stack for the program thread. A stack displacement value that is a difference between a base of the control stack and a base of the data stack is maintained in a processor register of the computing device that is immutable to programs running on the computing device in user mode, and the return address added to the control stack is a same return address as added to a data stack for the program thread. Upon exit from the function, a check is made as to whether the return address on the data stack matches the return address on the control stack. The program thread is allowed to continue running in response to the return address on the data stack matching the return address on the control stack, and a failure routine for deciding whether to terminate the program thread is invoked in response to the return address on the data stack not matching the return address on the control stack.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
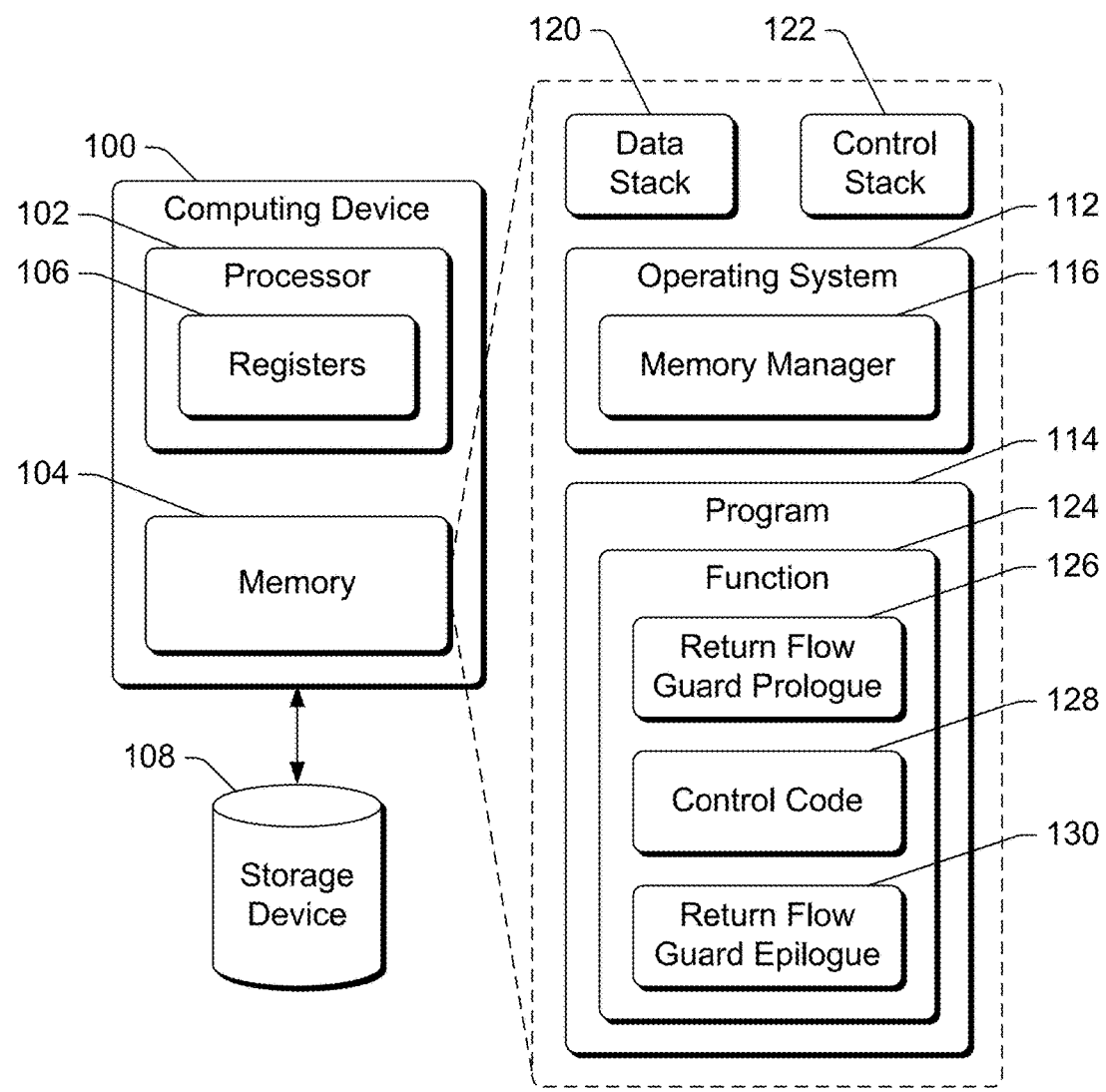
FIG. 1 is a block diagram illustrating an example computing device implementing the return flow guard using control stack identified by processor register in accordance with one or more embodiments.

Return flow guard using control stack identified by processor register is discussed herein. A program running on a computing device includes one or more threads. Each thread has an associated data stack and control stack. The data stack is used by the thread to store various different values in a last in first out manner, such as return addresses for function calls, processor general purpose register values, and other values as desired by the thread. The control stack, also referred to as a shadow stack, is used to store return addresses for function calls in a last in first out manner. A stack displacement value is generated, which is the difference between the memory address of the base of the data stack and the memory address of the base of the control stack. The stack displacement value is stored in a register of a processor of the computing device that is executing the thread and that is restricted to operating system kernel use, such as in the base address of the segment descriptor referred to by FS (e.g. MSR_FS_BASE). A register restricted to kernel use cannot be modified by programs running in user mode on the computing device, but can be modified by programs running in kernel mode on the computing device.

Return flow guard can be enabled on one or more program threads. For each thread on which return flow guard is enabled, prologue code and epilogue code are added to each function of the thread. As part of invoking a function in the thread, the processor stores the return address for the function on the data stack for the thread. The return address on the data stack is the memory address to which execution of the code of the thread is to return when the function has completed. The prologue code of the function copies the return address for the function from the data stack to the control stack. When the function has completed, the epilogue code compares the return address on the data stack to the return address on the control stack. If the return address on the data stack matches (e.g., is the same as) the return address on the control stack, then the thread continues to run, resuming execution of instructions at the return address. However, if the return address on the data stack does not match (e.g., is not the same as) the return address on the control stack, then an operating system provided failure routine is invoked that implements the policy for deciding whether to terminate the process or allow execution to continue. Return flow from a function is thus protected because if a malicious user or malicious code were to change the return address on the data stack, the return address on the data stack would not match the return address on the control stack and the failure routine would be invoked.

By maintaining the stack displacement value in a register of the processor, the location of the control stack storing the return address for the function can be readily accessed. The location of the control stack storing the return address for the function can be accessed using a data stack pointer that allows one-to-one indexing into the respective location on the control stack. The operating system maintains a data stack pointer (e.g., in an RSP register of the processor) that points to (includes the memory address of) the value most recently stored to the data stack. When a function is invoked, the data stack pointer points to a value that is the return address for the function. By adding the stack displacement value from the register of the processor to the value of the data stack pointer, the location of the control stack that points to (includes the memory address of) the value most recently stored to the control stack, which should store the copy of the return address can be generated.

Additionally, the program can be stored on a storage device without the prologue code and the epilogue code. The program as stored on the storage device includes placeholders for the prologue code and the epilogue code, such as no op (no operation) instructions. When pages including the program code are faulted into memory from the storage device, the memory manager inserts the prologue code and the epilogue code into the code for the program by replacing the placeholders with the prologue code and the epilogue code. This allows the same program to be used to support scenarios in which return flow guard is enabled and scenarios in which return flow guard is not enabled—multiple versions of the program (one supporting return flow guard and the other not supporting return flow guard) need not be maintained.

The control stack can also be stored in a restricted region of memory. Various properties can be imposed on the restricted region of memory to protect the control stack from being accessed by a malicious user or malicious code. The properties include, for example, that attempts to allocate or free memory within a restricted region fail, attempts to query the internal layout of the restricted region fail, attempts to access unmapped portions of the restricted region result in a fatal second chance exception, the density of mapped pages within the restricted region does not exceed a threshold amount (e.g., 1%), allocations start from a random offset within the restricted region, and so forth.

Thus, using the techniques discussed herein, a control stack can be used to verify the return address on the data stack and guard against a malicious user or code changing the return address on the data stack. The return address on the control stack can be readily identified from a processor register in which the stack displacement value is stored. The control stack is further protected against malicious code or users using various properties of a restricted region of memory in which the control stack is stored, preventing malicious code or users from identifying or altering the values on the control stack.

FIG. 1 is a block diagram illustrating an example computing device 100 implementing the return flow guard using control stack identified by processor register in accordance with one or more embodiments. Computing device 100 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, augmented reality (AR) devices, virtual reality (VR) devices), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, computing device 100 may range from a full resource device with substantial memory and processor resources (e.g., personal computers, game consoles) to a low resource device with limited memory and/or processing resources (e.g., traditional set-top boxes, hand-held game consoles).

Computing device 100 includes a processor 102 and a memory 104. The processor 104 includes one or more registers 106, each of which can store various values for programs running on the computing device 100. Although discussed herein with reference to a processor, it should be noted that the computing device 100 can include any number of processors and that the techniques discussed herein can be applied to each of multiple processors in the computing device 100. Similarly, the processor 102 can have multiple cores, each of which effectively operates as a processor, and the techniques discussed herein can be applied to each of multiple cores in the computing device processor 102.

The memory 104 can be any of a variety of different types of memory. In one or more embodiments, the memory 104 is volatile media (such as random access memory (RAM)), although other types of memory can additionally or alternatively be used.

The memory 104 stores an operating system 112 and a program 114. The operating system 112 includes various components and modules, including a memory manager 116. The memory manager 116 manages the allocation of regions of memory to program 114 and other programs running on the computing device 100. The memory manager 116 manages the memory 104 using paging to support a memory space that is larger than the amount of physical memory included in the computing device 100. The memory manger 116 organizes the memory 104 into pages, which are a particular (e.g., fixed) size unit of data. The act of paging refers to reading data in units of pages from a backing file (also referred to as the swap file), which is stored on a storage device 108 of the computing device 100, when the data is not in the memory 108. The storage device 108 can be any of a variety of different types of storage devices, such as nonvolatile memory (e.g., Flash memory), magnetic disk, optical disc, and so forth. The act of paging also refers to writing dirty (modified) data back in units of pages into the page file. The memory pages are thus also referred to as page file backed memory pages. Such paging techniques are well known to those skilled in the art.

The operating system 112 can have different parts (e.g., components, modules, or programs) that operate in different modes, including a privileged mode (e.g., kernel mode) and a non-privileged mode (e.g., user mode). Although referred to herein as kernel mode and user mode, other privileged and non-privileged, respectively, modes can alternatively be used. Programs run by the operating system 112, such as program 114, run in user mode. Parts of the operating system 112 operating in kernel mode can access certain functionality of the processor 102 (such as certain registers 106) that cannot be accessed by parts operating in user mode and that similarly cannot be accessed by program 114 operating in user mode. Additionally, the memory manager 116 allows certain regions of the memory 104 to be accessed by parts of the operating system 112 operating in kernel mode, but those regions of memory are not accessible to parts of the operating system 112 operating in user mode and similarly cannot be accessed by program 114 operating in user mode. The parts of the operating system 112 that run in kernel mode are also referred to as the operating system kernel.

The operating system 112 manages execution or running of program 114 on the computing device 100. Although a single program 114 is illustrated, it should be noted that multiple programs can be executed on the computing device 100 at the same and/or different times. The program 114 is executed as a process on the computing device 100 including one or more threads. The discussions herein describe the return flow guard with reference to a program thread. However, it should be noted that in some situations a program may not have multiple threads, in which case the program process itself can be viewed as the thread (e.g., the process has a single thread, which is itself).

The memory manager 116 allocates a data stack 120 and a control stack 122 to a thread of the program 114. In one or more embodiments, the memory manager 116 allocates the data stack 120 and control stack 122 to the thread at the time that the thread is created. Each thread of the program 114 has its own corresponding data stack and control stack. The memory manager 116 also generates a stack displacement value, which is the difference between the memory address of the base of the data stack 120 and the memory address of the base of the control stack 122. For example, the stack displacement value can be generated by subtracting the memory address of the base of the control stack from the memory address of the base of the data stack. The stack displacement value is stored in a register 106 of the processor 102.

The register 106 in which the stack displacement value is stored has various security properties that protect the contents of the register 106. In one or more embodiments, the register 106 in which the stack displacement value is stored is a constant value that is not written to the data stack 120. For example, in some situations the contents of general purpose registers of the processor 102 are written to the stack in order to allow the general purpose registers to be re-used, and the values can be subsequently read from the stack and re-stored in the general purpose registers at the appropriate time. The register 106 in which the stack displacement value is stored, however, is not a register that can be written to the stack. Furthermore, the register 106 in which the stack displacement value is stored is managed by parts of the operating system 112 operating in kernel mode and is immutable (e.g., inaccessible) to parts of the operating system 112 operating in user mode and is also immutable (e.g., inaccessible) to programs (such as program 114) operating in user mode. This provides protection against malicious users or code because the stack displacement value stored in the register 106 is not changeable (e.g., accessible) to programs running in user mode, and is not written out to the data stack 120 (and thus would not be available to user mode programs having access to the data stack 120). In one or more embodiments, the computing device 100 is an FS base register of a processor 102 that conforms to the x86 processor architecture.

The program 114 includes a function 124. A single function of the program is illustrated in FIG. 1, although it should be noted that the program 114 can include any number of functions. For each thread of the program 114 for which return flow guard is enabled, each function of the program includes a return flow guard prologue, control code, and a return flow guard epilogue. As shown in FIG. 1, the function 124 includes a return flow guard prologue 126, control code 128, and a return flow guard epilogue 128.

In response to the function 124 being invoked, the processor 102 writes the return address for the function 124 to the data stack 120. The return address for the function 124 is the memory address at which code execution is to resume upon completion of the function 124. The return flow guard prologue 126 (also referred to herein as simply the prologue) is code that copies the return address for the function 124 to the control stack 122. In one or more embodiments, the return address is copied to the control stack 122 from the data stack 120. Alternatively, the return address can be copied to the control stack 122 from other sources. For example, if the return address is stored in a register and not spilled to the control stack, then it may be copied from the Link Register (e.g., in an Advanced RISC Machine (ARM) processor) to the control stack 122.

The operating system 112 maintains a data stack pointer (e.g., in an RSP register of a processor 102 that conforms to the x86 processor architecture) that points to the value most recently stored to the data stack. The data stack pointer includes, for example, the memory address where the value most recently stored to the data stack is stored. The return flow guard prologue 126 adds the value of the data stack pointer to the value of the register 106 storing the stack displacement value to identify the memory address of the control stack 122 where the return address for the function 124 that is copied from the data stack 120 is to be stored.

The control code 128 then executes. The control code 128 performs various operations as desired by the designer of the function 124. It should be noted that these operations can include adding additional data to the data stack 120, and that the memory manager 116 can add additional data to the data stack 120 during execution of the control code 128. However, this additional data added to the data stack 120 by the control code 128 and/or memory manager 116 is not a return address of the function 124, and thus need not be copied to the control stack 122. However, it should be noted that if the control code 128 were to invoke an additional function (not shown), the operating system 112 would write an additional function return address to the data stack 120 so that execution can return to the function 124 upon completion of the additional function, and return flow guard prologue in that additional function would copy the additional function return address to the control stack 122.

Upon completion of execution of the control code 128, the return flow guard epilogue 130 is code that executes. The return flow guard epilogue 130 (also referred to herein as simply the epilogue) compares the return address on the data stack 120 to the return address on the control stack 122 and determines whether the two return addresses match (e.g., are the same). If the two return addresses match, then the thread of the program 114 continues to run. However, if the two return addresses do not match (e.g., are not the same), then the failure routine is invoked. Analogous to the discussion above regarding the return flow guard prologue 126, the return flow guard epilogue 128 uses the data stack pointer to identify the memory address of the data stack 120 where the return address for the function 124 is stored. The return flow guard epilogue 128 also adds the value of the data stack pointer to the value of the register 106 storing the stack displacement value to identify the memory address of the control stack 122 where the return address for the function 124 is stored.

By using the same data stack pointer, and the stack displacement value in the register 106, a one-to-one mapping of locations in the data stack 120 to locations in the control stack 122 can be readily maintained. An additional register for a control stack pointer for the control stack 122 need not be maintained. It should also be noted that this one-to-one mapping is maintained despite changes to the data stack pointer as additional data is stored on the data stack 120 by the control code 128 and/or the memory manager 116. This additional data need not be copied to the control stack 122, so the control stack 122 may be sparsely populated (e.g., does not store all of the data that is stored by the data stack 120).

Figure 2:
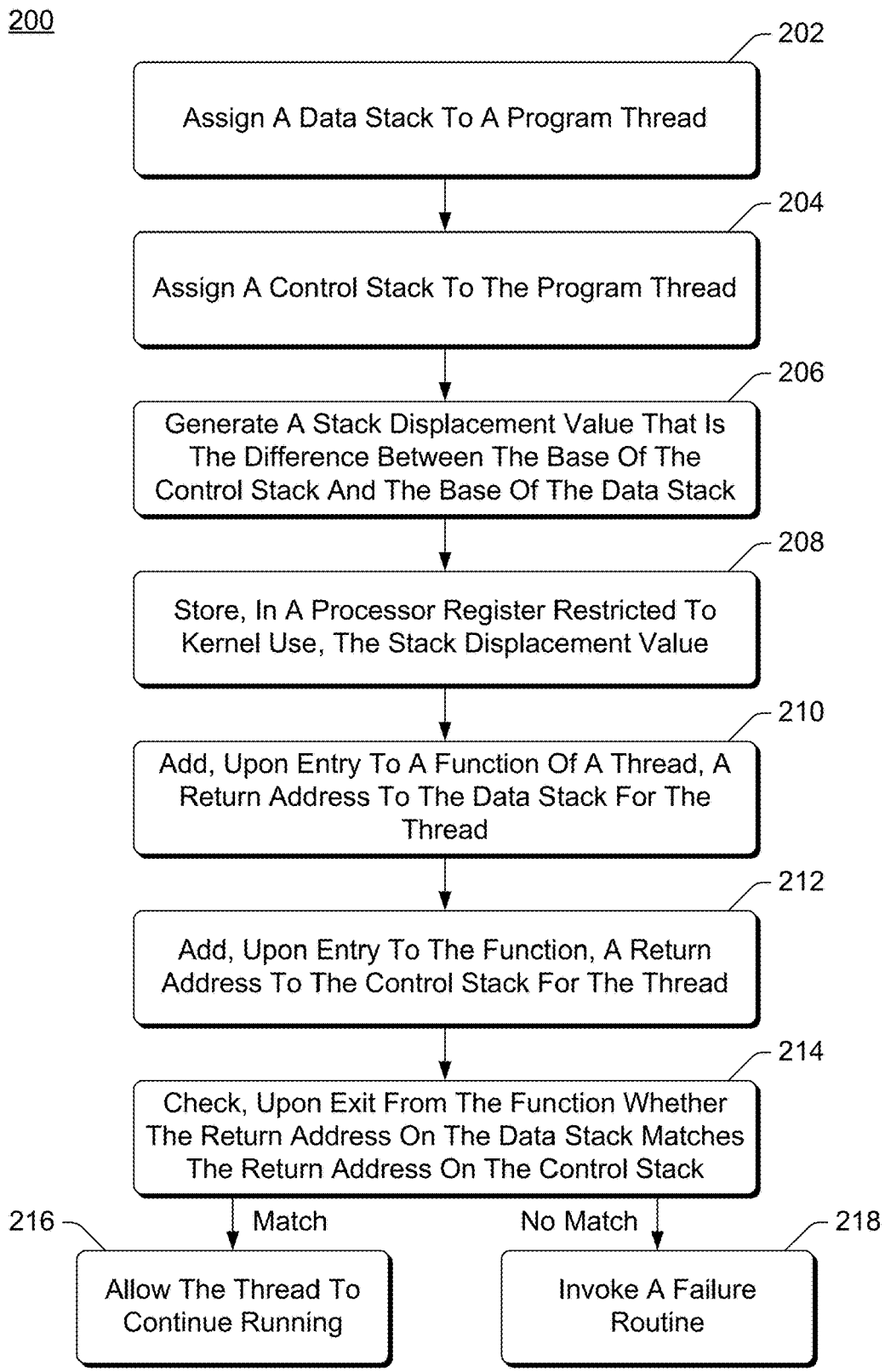
FIG. 2 is a flowchart illustrating an example process for implementing return flow guard using control stack identified by processor register in accordance with one or more embodiments.

FIG. 2 is a flowchart illustrating an example process 200 for implementing return flow guard using control stack identified by processor register in accordance with one or more embodiments. Process 200 is carried out by a computing device, such as computing device 100 of FIG. 1, and can be implemented in software, firmware, hardware, or combinations thereof. Process 200 is shown as a set of acts and is not limited to the order shown for performing the operations of the various acts. Process 200 is an example process for implementing return flow guard using control stack identified by processor register; additional discussions of implementing return flow guard using control stack identified by processor register are included herein with reference to different figures. Process 200 is discussed with additional reference to elements from FIG. 1.

In process 200, a data stack is assigned to a program thread (act 202). The data stack is assigned by, for example, the memory manager 116 allocating memory space for the data stack. The data stack can be assigned to the program thread at different times, such as in response to the program thread being created.

A control stack is also assigned to the program thread (act 204). The control stack is assigned by, for example, the memory manager 116 allocating memory space for the control stack. The control stack can be assigned to the program thread at different times, such as in response to the program thread being created.

A stack displacement value is also generated (act 206). The stack displacement value is the difference between the base of the control stack and the base of the data stack. The difference between the base of the control stack and the base of the data stack can be generated, for example, by subtracting the memory address of the base of the control stack from the memory address of the base of the data stack, or by subtracting he memory address of the base of the data stack from the memory address of the base of the control stack.

The stack displacement value is stored in a processor register (act 208). The processor register can be the FS base register of a processor that conforms to the x86 processor architecture. Alternatively, other processor registers to which access is restricted to kernel use (e.g., parts of the operating system operating in kernel mode) can be used.

Upon entry to a function of a thread, a return address is added to the data stack for the thread (act 210). This return address is the memory address at which code execution is to resume upon completion of the function. The return address is added to the data stack by, for example, the processor 102. This is also referred to as the return address being pushed onto the data stack.

Additionally, upon entry to the function of the thread, the return address is added to the control stack for the thread (act 212). This return address added to the control stack is the same return address as is added to the data stack, and in one or more embodiments is copied from the data stack for the thread to the control stack for the thread. The return address is added to the control stack by, for example, the return flow guard prologue 126.

Upon exit from the function (e.g., when execution of the control code 128 of the function has completed), a check is made as to whether the return address on the data stack matches the return address on the control stack (act 214). The control stack and data stack both operate in a last in first out manner, so these return addresses on the data stack and control stack are the return addresses on the tops of the data stack and the control stack. The check is made by, for example, the return flow guard epilogue 130.

If the return address on the top of the data stack matches (e.g., is the same as) the return address on the top of the control stack, then the thread is allowed to continue running (act 216). As part of continuing to run, the processor 102 resumes execution of instructions at the memory location identified by the return address, and the data stack pointer is updated to point to the memory location of the next lower location on the data stack. This is also referred to as the return address being popped from the data stack.

However, if the return address on the top of the data stack does not match (e.g., is not the same as) the return address on the top of the control stack, then the failure routine is invoked (act 218). The processor 102 can jump to execution of the failure routine to terminate the thread and/or take various other remedial actions, such as terminating the process that the thread is part of, notifying a user or administrator of the computing device 100, and so forth.

By invoking the failure routine, the techniques discussed herein help protect against memory corruption vulnerabilities that may be exploited by malicious users or code to overwrite return addresses located on the data stack and thus redirect control flow. A malicious user or code may be able to overwrite the return address on the data stack to achieve arbitrary code execution, such as by redirecting control flow to injected code or re-using existing code through Return Oriented Programming (ROP). However, using the techniques discussed herein, if the return address on the top of the data stack does not match the return address on the top of the control stack, the return flow guard epilogue assumes that the return address on the data stack has been compromised (e.g., altered by a malicious user or code) and invokes the failure routine, which can prevent return to and execution of the code the malicious user or malicious code desires to have executed.

Returning to FIG. 1, it should be noted that the return flow guard techniques discussed herein can be enabled for some threads of the program 114 and not enabled for other threads of the program 114. Which threads have return flow guard enabled and which threads have return flow guard disabled can be identified in different manners, such as specified by the program 114, specified by the operating system 112, and so forth. In situations in which return flow guard is not enabled for a thread, the memory manager 116 sets the stack displacement value for the thread to the value zero. Having a stack displacement value of 0 effectively causes the data stack and the control stack to be at the same location. If return flow guard were not enabled for a thread of the function 124, the return flow guard prologue 126 can still copy the return address from the data stack to the control stack, although with a stack displacement value of 0 the return flow guard prologue 126 would simply read from and copy to the same memory location. Similarly, the return flow guard epilogue 130 can still compare the return address from the top of the data stack to the return address from the top of the control stack, although with a stack displacement value of 0 the tops of the control stack and the data stack would be the same memory location (and thus the return addresses are expected to always match).

It should be noted that by using a stack displacement value of zero in situations in which return flow guard is not enabled, the same program can be readily used in situations in which return flow guard is enabled and situations in which return flow guard is not enabled. Two different versions of the program (one for when return flow guard is enabled and another for when return flow guard is not enabled) need not be maintained on the storage device 108, and two different versions of the program need not be maintained in the memory 104.

It should also be noted that the techniques discussed herein allows the manufacturer of the operating system 112 to maintain compliance with any existing application binary interface (ABI). The ABI refers to a contract that the manufacturer of the operating system 112 has regarding calling conventions and operations of functions running on the operating system 112. The techniques discussed herein do not require the return flow guard prologue and the return flow guard epilogue to be included in a function. Thus, any legacy function designed without the return flow guard prologue and the return flow guard epilogue will continue to operate as originally designed. It should be noted that the memory manager 116 may allocate a control stack 122 for functions that do not include the return flow guard prologue and the return flow guard epilogue, but that control stack 122 need not be used by (and can be completely ignored by) functions that do not include the return flow guard prologue and the return flow guard epilogue.

The techniques discussed herein are also usable when switching contexts between threads. In situations in which the stack displacement value is stored in the FS base register, when switching contexts between threads the FS segment register is reloaded with a constant, operating system-defined segment selector that refers to an entry in the Global Descriptor Table (GDT). The value of MSR_FS_BASE Model Specific Register (MSR) is also updated. If the thread being switched to has return flow guard enabled, then MSR_FS_BASE will hold the displacement between the control stack and data stack of the thread being switched to once it begins executing. If the thread being switched to does not enable return flow guard, then MSR_FS_BASE will hold 0. Additionally, if the thread being switched to has return flow guard enabled, the Present bit in the GDT entry corresponding to the FS segment is cleared. This is done to support program compatibility where a program may attempt to reload a segment register with the GDT entry corresponding to the entry used for FS. When this happens, the processor will issue a Segment Not Present (#NP) fault that the memory manager 116 can then emulate.

As discussed above, the memory manager 116 manages the memory 104. In one or more embodiments, the memory manager 116 sets aside a portion of the memory space as one or more restricted regions. Each restricted region has various properties, imposed by the memory manager 116, to protect the restricted region from being accessed by a malicious user or malicious code. For each thread, the control stacks for the thread are stored in a restricted region. The properties imposed on each restricted region by the memory manager 116 assist in preventing discovery of the control stack by malicious users or malicious code, for example by making it difficult for a malicious user or malicious code to discover the control stack through enumeration of the address space. The properties imposed on each restricted region by the memory manager 116 are enforced by the memory manager 116.

Figure 3:
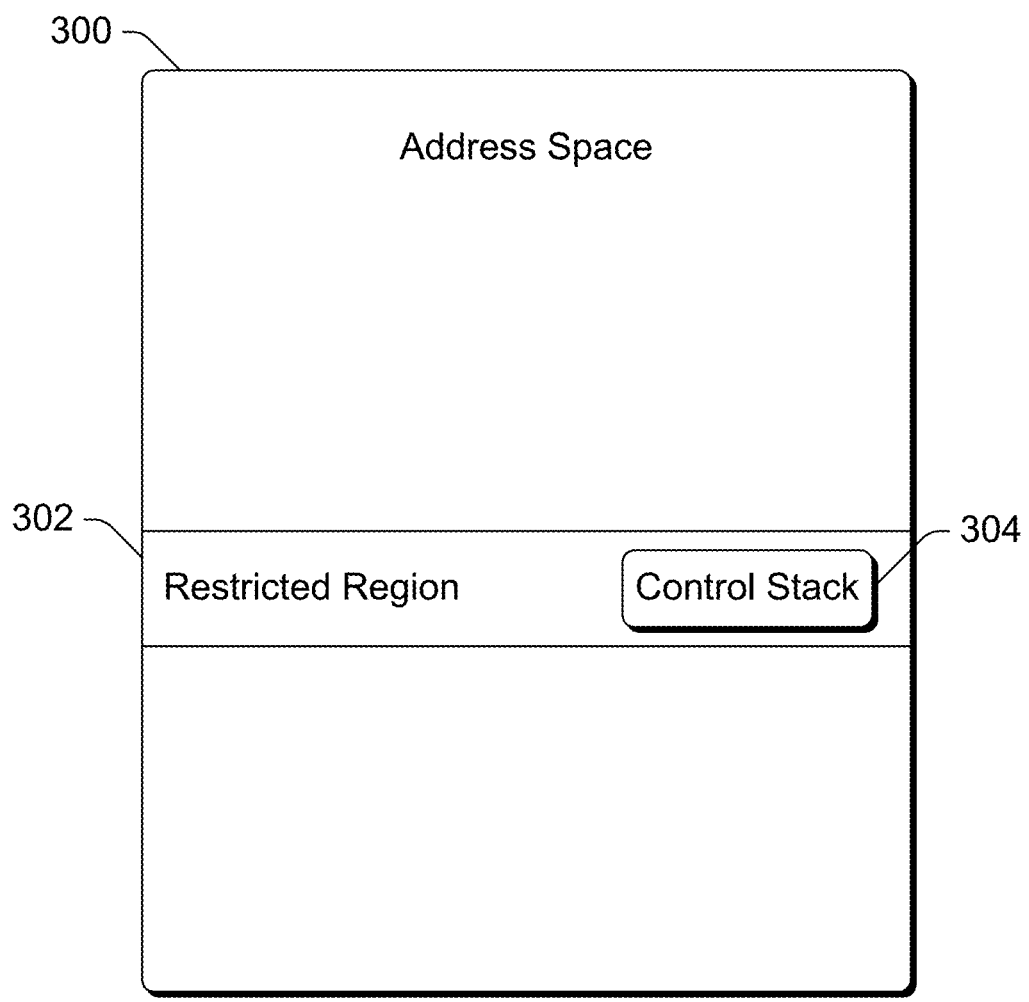
FIG. 3 illustrates an example of a restricted region in accordance with one or more embodiments.

FIG. 3 illustrates an example of a restricted region in accordance with one or more embodiments. An address space 300 for a computing device is illustrated including a restricted region 302. The address space 300 is typically larger than the amount of physical memory in the computing device, such as a result of using paging as discussed above. In one or more embodiments, the techniques discussed herein are implemented in a 64-bit address space. In such embodiments, the address space 300 is a 64-bit address space, resulting in 128 Terabytes (TB) of memory. The memory manager of the computing device designates a portion of the address space 300 as being a restricted region, illustrated as restricted region 302. The restricted region 302 can have various sizes, such as being 512 Gigabytes (GB). Although a single restricted region 302 is illustrated in the address space 300, alternatively multiple restricted regions (of the same and/or different sizes) can be included in the address space 300. Each restricted region can be located anywhere within the address space 300, although in one or more embodiments each restricted region is located in a portion of the address space 300 that is typically only accessible by the operating system kernel (e.g., the top 128 TB of the address space 300).

A control stack 304 is illustrated within the restricted region 302. Although a single control stack 304 is illustrated in FIG. 3, it should be noted that a separate control stack for each program thread executing on the computing device can be included in the restricted region 302. Including the control stack 304 in the restricted region 302 allows the properties imposed on the restricted region 302 by the memory manager to be leveraged to protect the control stack 304 from being accessed by malicious code or users. When a control stack is allocated, the memory manager selects a restricted region in the address space 300 with sufficient free space to satisfy the allocation request and also that satisfies the properties imposed on the restricted region by the memory manager. If a current restricted region does not exist with sufficient free space to satisfy the allocation request and that satisfies the properties imposed on the restricted region by the memory manager, the memory manager generates a new restricted region.

Examples of properties imposed on each restricted region, including the restricted region 302, by the memory manager are included herein. It should be noted that these properties are examples and that additional properties can be imposed on each restricted region and/or not all of these properties may be imposed on each restricted region.

One property imposed on the restricted region 302 is that attempts to allocate or free memory within a restricted region fail. Any application programming interface (API) methods that are invoked by a program (other than the memory manager) to allocate or free memory will fail if they attempt to reference memory within the restricted region 302. For example, in situations in which the operating system is one of the Windows® family of operating systems, any attempts to invoke VirtualAlloc, MapViewOfFile, or VirtualFree will fail if they attempt to reference memory within the restricted region 302.

Another property imposed on the restricted region 302 is that attempts to query the internal layout of the restricted region fail. Any API methods that are invoked by a program (other than the memory manager) will fail if they attempt to query the properties of an address in the restricted region 302, such as which portions of the restricted region 302 have been committed or allocated. For example, in situations in which the operating system is one of the Windows® family of operating systems, any attempts to invoke VirtualQuery will fail if they attempt to reference memory within the restricted region 302.

Another property imposed on the restricted region 302 is that attempts to access unmapped portions of the restricted region result in a fatal second chance exception. Dereferencing an unmapped address within the restricted region 302 will be gracefully handled by the page fault handler of the memory manager and will not be forwarded to a user mode program (a second chance exception access violation will occur). In the event that an operating system kernel program accesses an unmapped portion of the restricted region 302, the normal kernel mode exception code will run and a second chance exception will be raised upon return to user mode. Attempts to access unmapped portions of the restricted region will cause a fatal exception and invoking of the failure routine, or take an additional action to incur a delay on subsequent accesses to make it impractical to probe the restricted region.

Another property imposed on the restricted region 302 is that the density of mapped pages within the restricted region does not exceed a threshold amount (e.g., 1%). The memory manager ensures that the density of allocated pages within the region does not exceed the threshold amount (e.g., 1%, which is approximately 5,242 stacks that are 1 MB in size).

Another property imposed on the restricted region 302 is that allocations start from a random offset within the restricted region. The memory manager uses a random hint (which may be a pseudorandom hint) as the starting point within the restricted region 302 for searching for free pages to allocate a control stack.

Returning to FIG. 1, alternatively the control stack is not stored in a restricted region. For example, if the hardware of the computing device 100 (e.g., the processor 102 and/or other hardware components) allows write protection of the control stack, then such write protection can be leveraged and storing of the control stack in a restricted region need not be performed.

In one or more embodiments the program 114 as stored on the storage device 108 does not include the code for the return flow guard prologue 126 and the return flow guard epilogue 130. Rather, the program 114 as stored on the storage device 108 includes placeholders for the return flow guard prologue and the return flow guard epilogue, such as one or more no op (no operation) instructions. When pages including the program 114 code are faulted into the memory 104 from the storage device 108, the memory manager 116 inserts the return flow guard prologue code and the return flow guard epilogue code into the code for the program 114 by replacing the placeholders with the return flow guard prologue code and the return flow guard epilogue code.

Figure 4:
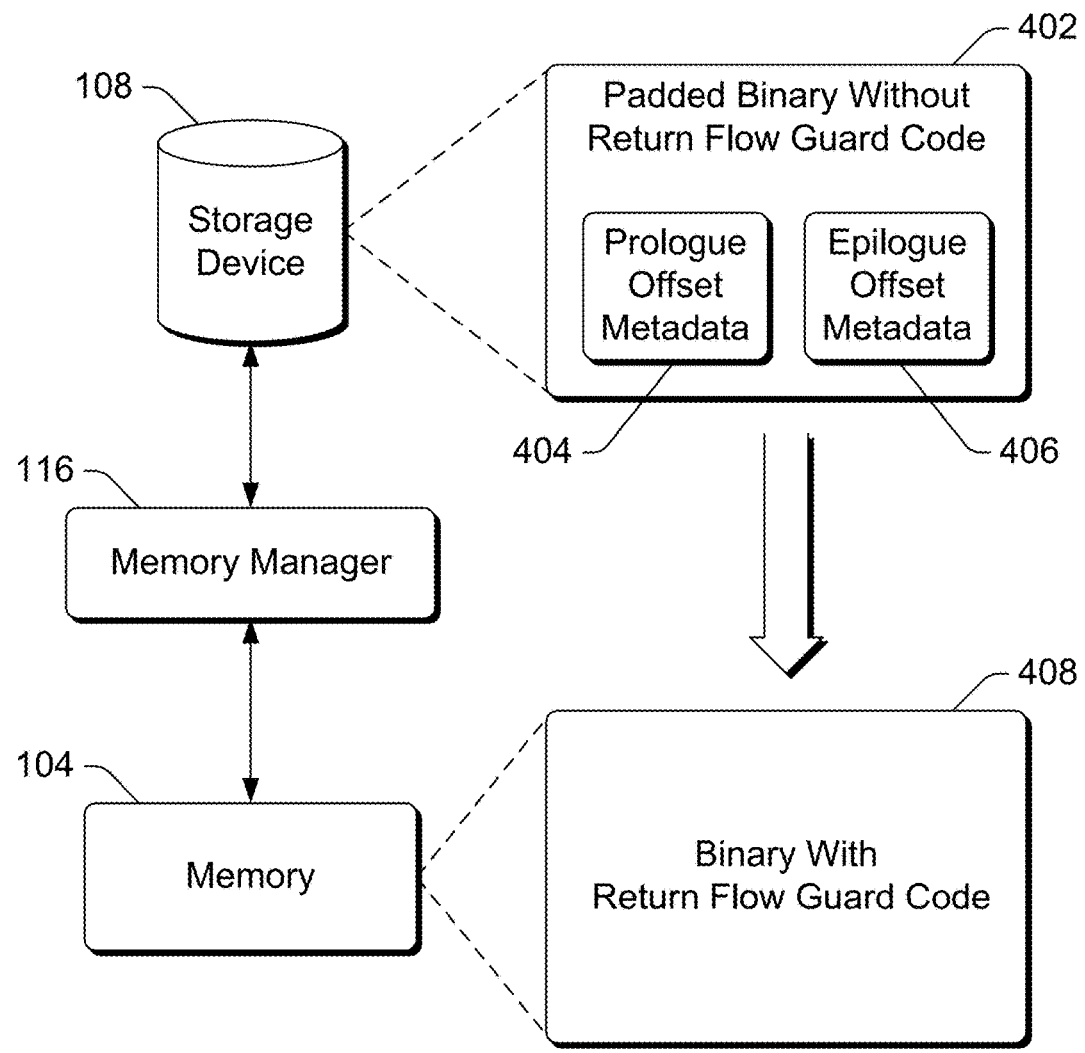
FIG. 4 illustrates an example system implementing the insertion of the return flow guard prologue code and the return flow guard epilogue code in accordance with one or more embodiments.

FIG. 4 illustrates an example system 400 implementing the insertion of the return flow guard prologue code and the return flow guard epilogue code in accordance with one or more embodiments. The return flow guard prologue code is also referred to herein as simply the prologue code, and the return flow guard epilogue code is also referred to herein as simply the epilogue code. The system 400 includes a storage device 108, memory manager 116, and memory 104 as discussed above. Stored on the storage device is one or more pages of code for a program, illustrated as a padded binary 402. The padded binary 402 includes placeholders (e.g., no op instructions) for the prologue code and the epilogue code but does not include the prologue code and the epilogue code itself. The padded binary 402 also includes prologue offset metadata 404 and epilogue offset data 406. The prologue offset metadata 404 identifies where, in the padded binary 402, the placeholders are for the prologue code. Similarly, the epilogue offset metadata 406 identifies where, in the padded binary 402, the placeholders are for the epilogue code.

When pages of the padded binary 402 are faulted into the memory 104 from the storage device 108, the memory manager 116 reads the pages including the padded binary 402 from the storage device 108. The memory manager 116 accesses the prologue offset metadata 404 to determine the locations in the padded binary 402 of the placeholders for the prologue code and inserts the prologue code into those locations. Similarly, the memory manager 116 accesses the epilogue offset metadata 406 to determine the locations in the padded binary 402 of the placeholders for the epilogue code and inserts the epilogue code into those locations. After inserting the prologue code and the epilogue code, the binary with the return flow guard code 408 is stored in the memory 104.

The placeholders can be inserted into the padded binary 402 in a variety of different manners. In one or more embodiments, the developer of the padded binary 402 inserts the placeholders and generates the prologue offset metadata 404 and epilogue offset metadata 406. Alternatively, the placeholders can be automatically inserted by a compiler. A compiler refers to a program that generates executable binary code from a higher level instruction language. In situations in which the compiler inserts the placeholders, the compiler that generates the padded binary 402 adds the placeholders and generates the prologue offset metadata 404 and epilogue offset metadata 406. In situations in which the compiler adds the placeholders, the compiler marks the placeholders as having side effects on specific registers (e.g., killing the RAX register in the prologue and killing the R11 register in the epilogue, following the example of FIG. 5 below) to facilitate proper code generation despite the code being generated including no op instructions as the placeholders. This marking the side effects on specific registers allows compile time code optimization techniques to properly consider the side effects of these instructions in the presence of the instrumentation that may be inserted at runtime.

The placeholders are of sufficient size so that the memory manager can replace the placeholders with the prologue code and the epilogue code. For example, the compiler can add a 9-byte no op instruction to the beginning of each function, and add 15 bytes of no op instructions after the return instruction at the end of each function.

Having the memory manager 116 insert the prologue code and the epilogue code when the pages of the padded binary 402 are faulted into the memory 104 has various benefits. The binaries stored on the storage device 108 can be used with versions of the operating system that do not support return flow guard—the binaries simply include placeholders (e.g., no op instructions) that can be executed and the epilogue code and prologue code need never be added into the code. Furthermore, the pages that are faulted in from disk can be shared between processes for which return flow guard is enabled and processes for which return flow guard is not enabled. Thus, two copies of the binary (one with the epilogue code and prologue code, the other without the epilogue code and prologue code) need not be maintained on the storage device 108.

Additionally, this approach of having the memory manager 116 insert the prologue code and the epilogue code when the pages of the padded binary 402 are faulted into the memory 104 facilitates transparent cutover to hardware assisted shadow stack protection on computing devices that support hardware assisted shadow stack protection. If running on a computing device that supports hardware assisted shadow stack protection, the memory manager 116 can cease inserting the prologue code and the epilogue code when the pages of the padded binary 402 are faulted into the memory 104. This avoids the situation of having the prologue code and the epilogue code in functions when it is not needed to the use of hardware assisted shadow stack protection.

Figure 5:
FIG. 5 illustrates an example of the padded binary and insertion of the return flow guard prologue code and the return flow guard epilogue code in accordance with one or more embodiments.

FIG. 5 illustrates an example 500 of the padded binary and insertion of the return flow guard prologue code and the return flow guard epilogue code in accordance with one or more embodiments. The padded binary 402 is shown having multiple instructions. The padded binary 402 includes a placeholder 502, which is a no op instruction. The location of the placeholder 502 is specified by the entry 504 in the prologue offset metadata 404. The padded binary 402 also includes a placeholder 506, which is multiple no op instructions added after the return instruction 508. Additionally or alternatively, the placeholder 506 can be placed before the return instruction 508. The location of the return instruction that precedes the placeholder 506 is specified by the entry 510 in the epilogue offset metadata 406.

The memory manager reads the padded binary 402 and stores the binary 408 in memory. The memory manager uses the prologue offset metadata 404 to identify the location of the placeholder 502 and replaces the placeholder 502 with prologue code 512. The "mov rax,qword ptr [rsp]" instruction of the prologue code 512 loads the return address into the RAX register of the processor, and the "mov qword ptr fs:[rsp],rax" instruction of the prologue code 512 stores the return address into the control stack.

The memory manager also uses the epilogue offset metadata 406 to identify the location of the placeholder 506. The memory manager replaces the placeholder 506 with the epilogue code 514, and situates the epilogue code 514 to precede the return instruction 508. The "mov r11,qword ptr fs:[rsp]" instruction of the epilogue code 514 loads the return address from the control stack into the r11 register of the processor, the "cmp r11,qword ptr [rsp]" instruction of the epilogue code 514 compares the return address loaded from the control stack to the return address on the data stack, and the "jne D11!_guard_ss_verify_failure" instruction of the epilogue code 514 jumps to a failure routine of the operating system if the comparison indicates that the two return addresses are not equal. If the comparison indicates that the two return addresses are equal, the jump is not performed, and the function returns.

FIG. 5 illustrates example prologue code and epilogue code. Alternatively, in one or more embodiments, different prologue code and epilogue code can be used for leaf functions (e.g., functions that do not use any stack or call other functions). For example, the prologue code can be "mov reg, [rsp]", which loads the data stack pointer into a register "reg", which is a volatile register that is not otherwise being used by the function. The epilogue code can be "cmp reg, [rsp]" followed by "jne failure_routine", which compares the data stack pointer to the value in the register "reg" and jumps to the failure routine if the value of the data stack pointer does not equal the value in the register "reg". This abbreviated sequence for leaf functions avoids the store and load to the control stack and is still safe because the register "reg" cannot be tampered with (it is never spilled).

Figure 6:
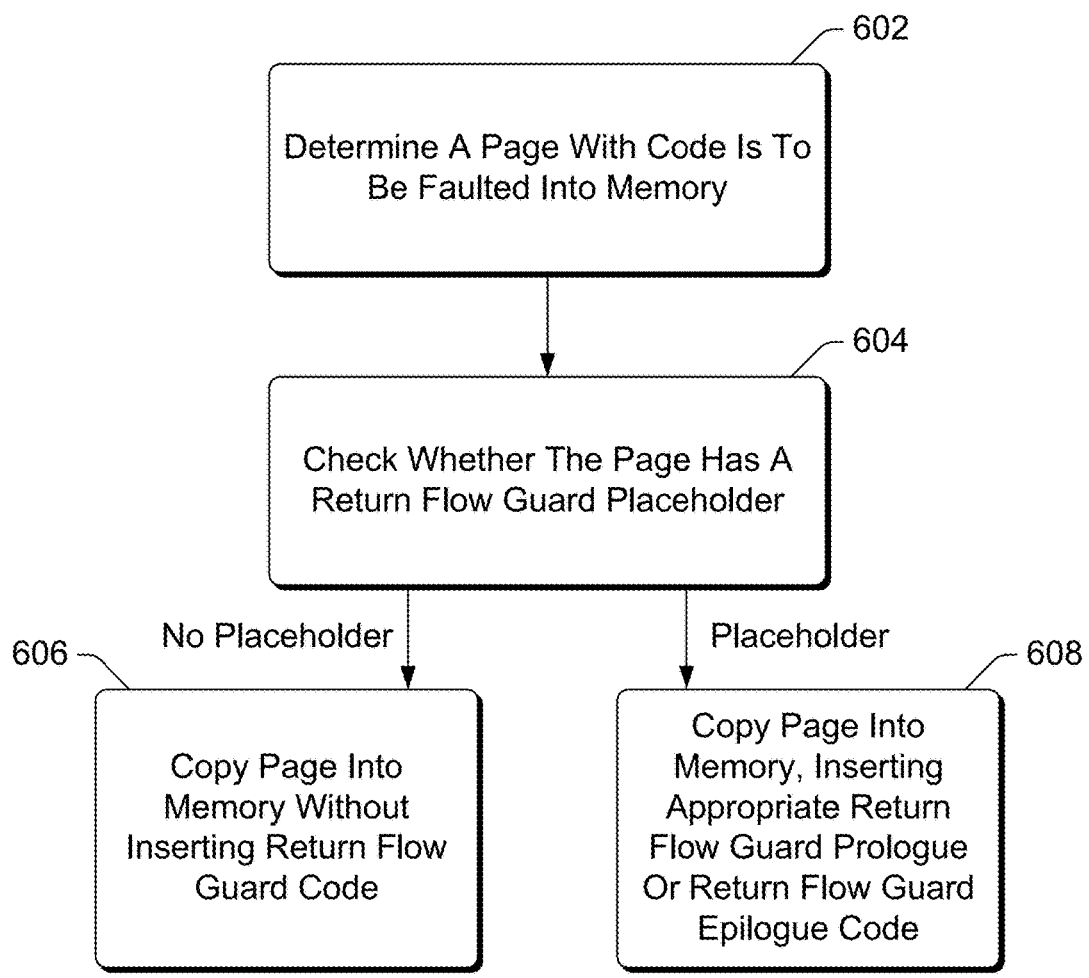
FIG. 6 is a flowchart illustrating an example process for loading a memory page into memory in accordance with one or more embodiments.

FIG. 6 is a flowchart illustrating an example process 600 for loading a memory page into memory in accordance with one or more embodiments. Process 600 is carried out by a memory manager, such as memory manager 116 of FIG. 1, and can be implemented in software, firmware, hardware, or combinations thereof. Process 600 is shown as a set of acts and is not limited to the order shown for performing the operations of the various acts. Process 600 is an example process for loading a memory page into memory; additional discussions of loading a memory page into memory are included herein with reference to different figures.

In process 600, a determination is made that a page with code is to be faulted into memory (act 602). This determination can be made in a variety of different manners, such as in response to a request to access a memory location on a page that is not currently in memory.

In response to the determination, a check is made as to whether the page has a return flow guard placeholder (act 604). The page may have one or both of a placeholder for a return flow guard prologue or a return flow guard epilogue, or may have a placeholder for neither. Whether the page has a placeholder for a return flow guard prologue or a return flow guard epilogue is determined using the prologue offset metadata and the epilogue offset metadata, respectively as discussed above.

If the page has placeholder for nether a return flow guard prologue nor a return flow guard epilogue, then the page is copied into memory without inserting return flow guard code (act 606).

However, if the placeholder has one or both of a return flow guard prologue and a return flow guard epilogue, then the page is copied into memory and the appropriate prologue code or epilogue code is inserted (act 608). The insertion can occur at different points, such as after the page is copied into memory or as the page is copied into memory (e.g., placeholders can be replaced with the appropriate prologue code or epilogue code after reading the placeholder from the storage device and before writing the inserted prologue code or epilogue code to memory). The prologue code is inserted if the check in at 604 indicates that the page includes a placeholder for a return flow guard prologue, and the epilogue code is inserted if the check in at 604 indicates that the page includes a placeholder for a return flow guard epilogue.

In the discussions herein, reference is made to replacing each placeholder for a return flow guard epilogue with the epilogue code. Alternatively, a common epilogue stub can be used for multiple functions. In such situations, the placeholder for the return flow guard epilogue is replaced with a jump to the common epilogue stub, which is the epilogue code discussed above. By sharing the same epilogue code, the sizes of binaries are reduced because the epilogue code can be included once in the binary and the placeholders are replaced with simple jump instructions, thereby saving code size and reducing storage device space usage.

It should be noted that situations can arise in which return flow guard prologues or return flow guard epilogues straddle page boundaries. The memory manager identifies and handles these situations by applying straddled insertions. Each page on the storage device will contain a hint into the prologue offset metadata and/or epilogue offset metadata that allows the memory manager to quickly seek to offsets where insertions are to be made. In the case of straddle insertions, the seek hint will point to a previous page offset if the insertion straddles. Because the memory manager can calculate the delta between a straddle insertion and the page boundaries and the contents of the code to be inserted, the memory manager can efficiently apply straddle insertions.

Embodiments are discussed herein in which the program 114 as stored on the storage device 108 does not include the code for the return flow guard prologue 126 and the return flow guard epilogue 130. Additionally or alternatively, one or more programs as stored on the storage device 108 can include the code for the return flow guard prologue and the return flow guard epilogue. Thus, rather than the monitoring module inserting the code for the return flow guard prologue and the return flow guard epilogue when pages including the program code are faulted into memory 104 from the storage device 108, the program as copied into memory from the storage device 108 can already have the code for the return flow guard prologue and the return flow guard epilogue.

It should also be noted that, rather than inserting the appropriate prologue code and epilogue code when a page is copied into memory, the prologue code and epilogue code can alternatively be inserted using dynamic binary translation. Using dynamic binary translation, a translator module is used to rewrite binaries as they execute. The translator module is configured to rewrite binaries to replace the placeholders with the appropriate prologue and epilogue code as the binaries execute.

Returning to FIG. 1, it should be noted that various additional considerations can be incorporated into the techniques discussed herein to support various different usage scenarios. In one or more embodiments, the operating system 112 supports threads that are referred to as fibers, and the techniques discussed herein support user mode stack switching. To support user mode stack switching, if return flow guard is enabled for a thread, the memory manager issues a new software interrupt that will cause the operating system to swap the control stack for the thread. Alternatively, if the processor 102 supports fast switching of the data stack pointer in user mode, this fast switching can be used to avoid incurring a software interrupt.

Additionally, the techniques discussed herein assume that the value of the data stack pointer at any given time is a valid data stack address. If a malicious user or malicious code were able to point the data stack pointer beyond the bounds of a valid data stack, then they may be able to subvert the return address verification logic by tricking the program into verifying return addresses using a bogus control stack displaced by data stack pointer. In order to prevent this from happening, an additional check is added (e.g., by the memory manager or the operating system kernel) to verify that the data stack pointer is within bounds of a data stack. If the data stack pointer is not within bounds of a data stack, then the failure routine is invoked. This check is added to various different functions, such as longjmp, NtContinue, and alloca in the Windows® family of operating systems.

It should be further be noted that in some contexts, it may be necessary for one thread (e.g., a thread A) to make use of another thread's (e.g., thread B's) stack data. This can occur, for example, during cross-thread unwinding. In these situations, it can be difficult for thread A to verify that data against thread B's control stack, as the location of thread B's control stack is secret. However, the reason thread B's control stack is secret is for protection against malicious users or code; its contents don't need to be kept secret. Accordingly, the operating system can create a second mapping for thread A's control stack which will be read-only. Due to the read-only property, the location of thread A's control stack not need to be a secret, and thread B will be able to find thread A's control stack and securely make use of thread A's control stack for verification. Thread B can securely find the location of thread A's read-only control stack mirror in various manners, such as by storing the location in a read-only portion of thread A's Thread Environment Block for the Windows® family of operating systems. The location is read-only, so the operating system guarantees that that read-only mirror mapping cannot be changed by user-mode programs to become writable.

It should also be noted that the techniques discussed herein support interoperability in situations in which a single process has both binaries that include the prologue code and epilogue code and binaries that do not include the prologue code and epilogue code. Such processes can still run because the epilogue and prologue code are included in the functions—if a binary function does not support the return flow guard then it will not have the epilogue and prologue code and simply will not perform the return flow guard checks whereas other functions will perform the return flow guard checks. Similarly, a binary can link to a library that does not support the return flow guard—the functions of the binary will still perform the return flow guard checks whereas the linked-to library functions will not perform the return flow guard checks because they do not include the epilogue code and the prologue code.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 7:
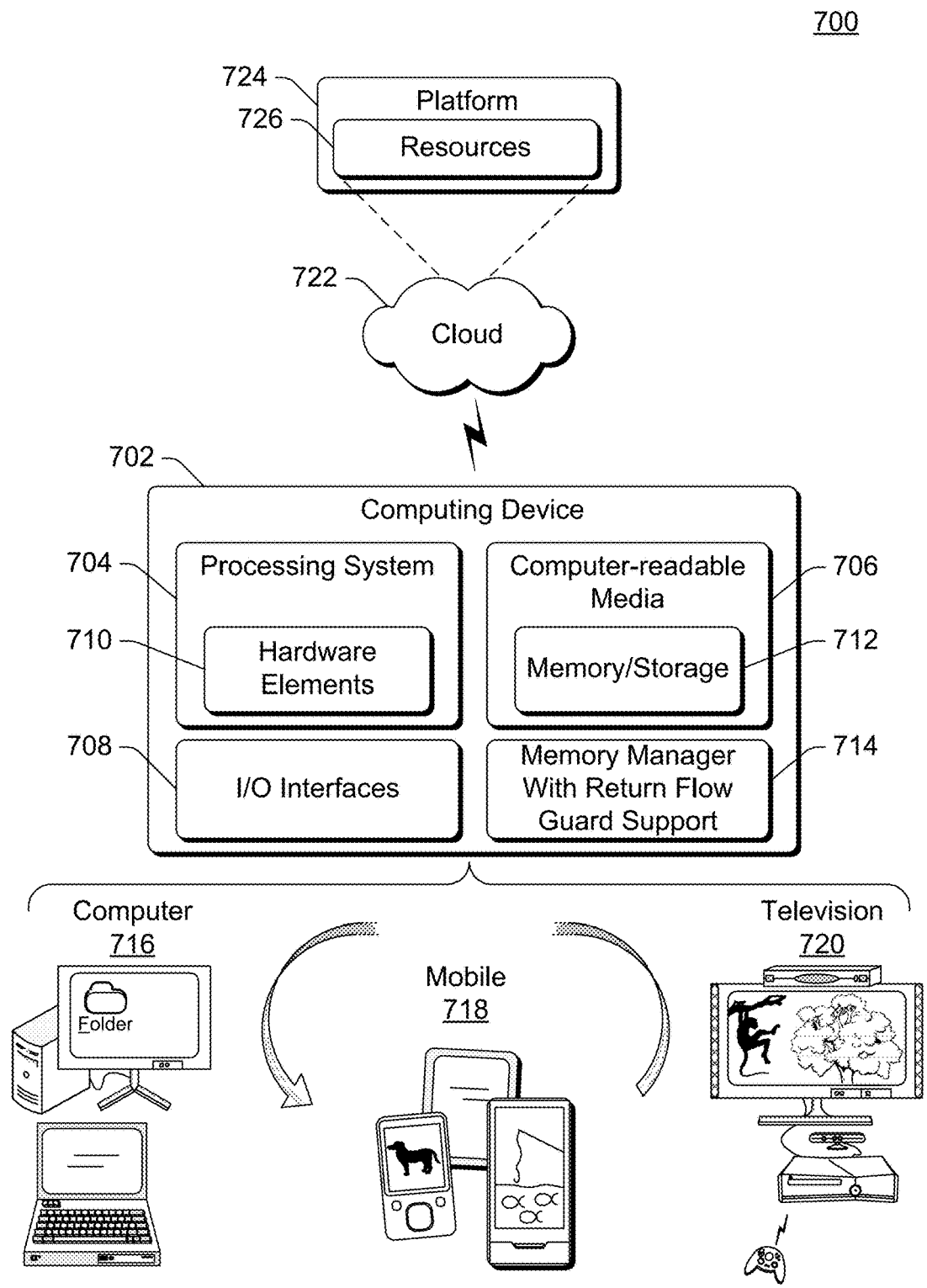
FIG. 7 illustrates an example system that includes an example computing device that is representative of one or more systems and/or devices that may implement the various techniques described herein.

FIG. 7 illustrates an example system generally at 700 that includes an example computing device 702 that is representative of one or more systems and/or devices that may implement the various techniques described herein. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Resistive RAM (ReRAM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

The one or more input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

The computing device 702 also includes a memory manager with return flow guard support 714. The memory manager 714 provides various memory manager functionality, including inserting prologue code and epilogue code as appropriate and allocating control stacks as discussed above. The memory manager 714 can implement, for example, the memory manager 116 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 702 may assume a variety of different configurations, such as for computer 716, mobile 718, and television 720 uses. Each of these configurations includes devices that may have generally different constructs and capabilities, and thus the computing device 702 may be configured according to one or more of the different device classes. For instance, the computing device 702 may be implemented as the computer 716 class of a device that includes a personal computer, desktop computer, a multi-screen computer, laptop computer, netbook, and so on.

The computing device 702 may also be implemented as the mobile 718 class of device that includes mobile devices, such as a mobile phone, portable music player, portable gaming device, a tablet computer, a multi-screen computer, and so on. The computing device 702 may also be implemented as the television 720 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This functionality may also be implemented all or in part through use of a distributed system, such as over a "cloud" 722 via a platform 724 as described below.

The cloud 722 includes and/or is representative of a platform 724 for resources 726. The platform 724 abstracts underlying functionality of hardware (e.g., servers) and software resources of the cloud 722. The resources 726 may include applications and/or data that can be utilized while computer processing is executed on servers that are remote from the computing device 702. Resources 726 can also include services provided over the Internet and/or through a subscriber network, such as a cellular or Wi-Fi network.

The platform 724 may abstract resources and functions to connect the computing device 702 with other computing devices. The platform 724 may also serve to abstract scaling of resources to provide a corresponding level of scale to encountered demand for the resources 726 that are implemented via the platform 724. Accordingly, in an interconnected device embodiment, implementation of functionality described herein may be distributed throughout the system 700. For example, the functionality may be implemented in part on the computing device 702 as well as via the platform 724 that abstracts the functionality of the cloud 722.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a computing device, the method comprising: assigning a data stack to a program thread, a return address for a function of the program thread, upon entry to the function, being added to the data stack for the program thread; assigning a control stack to the program thread, the return address for the function of the program thread, upon entry to the function, being copied to the control stack for the program thread; storing, in a processor register of the computing device, a stack displacement value that is a difference between a base of the control stack and a base of the data stack, the processor register being immutable to programs running on the computing device in user mode; and resuming, in response to the return address on the data stack for the program thread matching a return address on the control stack for the program thread, execution of the program thread at the return address upon completion of the function.

Alternatively or in addition to any of the above described methods, any one or combination of: the assigning the control stack to the program thread comprising allocating memory in a restricted region of an address space of the computing device to the control stack, the method further comprising imposing one or more properties on the restricted region, the one or more properties including attempts to allocate or free memory within the restricted region by other programs fail; the assigning the control stack to the program thread comprising allocating memory in a restricted region of an address space of the computing device to the control stack, the method further comprising imposing one or more properties on the restricted region, the one or more properties including attempts to query the internal layout of the restricted region fail; the assigning the control stack to the program thread comprising allocating memory in a restricted region of an address space of the computing device to the control stack, the method further comprising imposing one or more properties on the restricted region, the one or more properties including attempts to access unmapped portions of the restricted region result in a fatal second chance exception; the assigning the control stack to the program thread comprising allocating memory in a restricted region of an address space of the computing device to the control stack, the method further comprising imposing one or more properties on the restricted region, the one or more properties including a density of mapped pages within the restricted region does not exceed a threshold amount; the assigning the control stack to the program thread comprising allocating memory in a restricted region of an address space of the computing device to the control stack, the method further comprising imposing one or more properties on the restricted region, the one or more properties including allocations of memory within the restricted region start from a random offset within the restricted region; the method further comprising executing a failure routine to apply a policy to determine whether to terminate the program thread in response to the return address on the data stack not matching the return address on the control stack; the method further comprising reading, from a storage device, a page including binary code for the program thread, checking whether the page includes a first placeholder for a return flow guard prologue or a second placeholder for a return flow guard epilogue, copying the page into memory, inserting return flow guard prologue code in place of the first placeholder in response to determining that the page includes the first placeholder, and inserting return flow guard epilogue code in place of the second placeholder in response to determining that the page includes the second placeholder; the checking comprising checking prologue offset metadata and epilogue offset metadata in the binary code for the program thread; the first placeholder comprising one or more no op instructions, and the second placeholder comprising one or more no op instructions.

A method implemented in a computing device, the method comprising: adding, upon entry to a function of a program thread, a return address for the function to a control stack for the program thread, a stack displacement value that is a difference between a base of the control stack and a base of the data stack being maintained in a processor register of the computing device that is immutable to programs running on the computing device in user mode, and the return address added to the control stack being a same return address as added to a data stack for the program thread; checking, upon exit from the function, whether the return address on the data stack matches the return address on the control stack; allowing the program thread to continue running in response to the return address on the data stack matching the return address on the control stack; and invoking a failure routine for deciding whether to terminate the program thread in response to the return address on the data stack not matching the return address on the control stack.

Alternatively or in addition to any of the above described methods, any one or combination of: the adding the return address to the control stack comprising copying the return address from the data stack to the control stack; the checking comprising determining that the return address on the data stack matches the return address on the control stack if the return address on the top of the data stack is the same as the return address on the top of the control stack.

A computing device comprising: a processor including a register that is immutable to programs running on the computing device in user mode; and a computer-readable storage medium having stored thereon multiple instructions that, responsive to execution by the processor, cause the processor to: assign a data stack to a program thread, the processor adding a return address for a function of the program thread, upon entry to the function, to the data stack for the program thread; assign a control stack to the program thread; store, in the register, a stack displacement value that is a difference between a base of the control stack and a base of the data stack; and resume, in response to the return address on the data stack for the program thread matching a return address on the control stack for the program thread, execution of the program thread at the return address upon completion of the function.

Alternatively or in addition to any of the above described computing devices, any one or combination of: the multiple instructions further causing the processor to read, from a storage device of the computing device, a page including binary code for the program thread, check whether the page includes a first placeholder for a return flow guard prologue or a second placeholder for a return flow guard epilogue, copy the page into memory, insert return flow guard prologue code in place of the first placeholder in response to determining that the page includes the first placeholder, and insert return flow guard epilogue code in place of the second placeholder in response to determining that the page includes the second placeholder; wherein to check whether the page includes a first placeholder or a second placeholder is to check prologue offset metadata and epilogue offset metadata in the binary code for the program thread; the first placeholder comprising one or more no op instructions, and the second placeholder comprising one or more no op instructions; wherein to assign the control stack to the program thread is to allocate memory in a restricted region of an address space of the computing device to the control stack, the multiple instructions further causing the processor to impose one or more properties on the restricted region, the one or more properties including attempts to allocate or free memory within the restricted region by other programs fail, and attempts to query the internal layout of the restricted region fail; the one or more properties further including attempts to access unmapped portions of the restricted region result in a fatal second chance exception, a density of mapped pages within the restricted region does not exceed a threshold amount, and allocations of memory within the restricted region start from a random offset within the restricted region; the multiple instructions further causing the processor to read, from a storage device of the computing device, a page including binary code for the program thread, check whether the page includes a first placeholder for a return flow guard prologue or a second placeholder for a return flow guard epilogue, insert, using dynamic binary translation, return flow guard prologue code in place of the first placeholder in response to determining that the page includes the first placeholder, and insert, using dynamic binary translation, return flow guard epilogue code in place of the second placeholder in response to determining that the page includes the second placeholder.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
    assigning a data stack to a program thread, a return address for a function of the program thread, upon entry to the function, being added to the data stack for the program thread;
    assigning a control stack to the program thread, the return address for the function of the program thread, upon entry to the function, being copied to the control stack for the program thread, the control stack being included in a restricted region of memory of the computing device, the restricted region of memory being accessible only by an operating system kernel on the computing device;
    storing, in a processor register of the computing device, a stack displacement value that is a difference between a base of the control stack and a base of the data stack, the processor register being immutable to programs running on the computing device in user mode; and resuming, in response to the return address on the data stack for the program thread matching a return address on the control stack for the program thread, execution of the program thread at the return address on the data stack upon completion of the function.

2. The method as recited in claim 1, the restricted region comprising an address space of the computing device, the assigning the control stack to the program thread comprising allocating memory in the restricted region to the control stack, the method further comprising imposing one or more properties on the restricted region, the one or more properties including attempts to allocate or free memory within the restricted region by other programs fail.

3. The method as recited in claim 1, the restricted region comprising an address space of the computing device, the assigning the control stack to the program thread comprising allocating memory in the restricted region to the control stack, the method further comprising imposing one or more properties on the restricted region, the one or more properties including attempts to query the internal layout of the restricted region fail.

4. The method as recited in claim 1, the restricted region comprising an address space of the computing device, the assigning the control stack to the program thread comprising allocating memory in the restricted region to the control stack, the method further comprising imposing one or more properties on the restricted region, the one or more properties including attempts to access unmapped portions of the restricted region result in a fatal second chance exception.

5. The method as recited in claim 1, the restricted region comprising an address space of the computing device, the assigning the control stack to the program thread comprising allocating memory in the restricted region to the control stack, the method further comprising imposing one or more properties on the restricted region, the one or more properties including a density of mapped pages within the restricted region does not exceed a threshold amount.

6. The method as recited in claim 1, the restricted region comprising an address space of the computing device, the assigning the control stack to the program thread comprising allocating memory in the restricted region to the control stack, the method further comprising imposing one or more properties on the restricted region, the one or more properties including allocations of memory within the restricted region start from a random offset within the restricted region.

7. The method as recited in claim 1, further comprising executing a failure routine to apply a policy to determine whether to terminate the program thread in response to the return address on the data stack not matching the return address on the control stack.

8. The method as recited in claim 1, further comprising:
reading, from a storage device, a page including binary code for the program thread;
checking whether the page includes a first placeholder for a return flow guard prologue or a second placeholder for a return flow guard epilogue;
copying the page into memory;
inserting return flow guard prologue code in place of the first placeholder in response to determining that the page includes the first placeholder; and
inserting return flow guard epilogue code in place of the second placeholder in response to determining that the page includes the second placeholder.

9. The method as recited in claim 8, the checking comprising checking prologue offset metadata and epilogue offset metadata in the binary code for the program thread.

10. The method as recited in claim 8, the first placeholder comprising one or more no op instructions, and the second placeholder comprising one or more no op instructions.

11. A method implemented in a computing device, the method comprising:
adding, upon entry to a function of a program thread, a return address for the function to a control stack for the program thread, a stack displacement value that is a difference between a base of the control stack and a base of the data stack being maintained in a processor register of the computing device that is immutable to programs running on the computing device in user mode, and the return address added to the control stack being a same return address as added to a data stack for the program thread, the control stack being included in a restricted region of memory of the computing device, the restricted region of memory being accessible only by an operating system kernel on the computing device;
checking, upon exit from the function, whether the return address on the data stack matches the return address on the control stack;
allowing the program thread to continue running in response to the return address on the data stack matching the return address on the control stack; and
invoking a failure routine for deciding whether to terminate the program thread in response to the return address on the data stack not matching the return address on the control stack.

12. The method as recited in claim 11, the adding the return address to the control stack comprising copying the return address from the data stack to the control stack.

13. The method as recited in claim 11, the checking comprising determining that the return address on the data stack matches the return address on the control stack if the return address on the top of the data stack is the same as the return address on the top of the control stack.

14. A computing device comprising:
a processor including a register that is immutable to programs running on the computing device in user mode; and
a computer-readable storage medium having stored thereon multiple instructions that, responsive to execution by the processor, cause the processor to:
assign a data stack to a program thread, the processor adding a return address for a function of the program thread, upon entry to the function, to the data stack for the program thread;
assign a control stack to the program thread, the control stack being included in a restricted region of memory of the computing device, the restricted region of memory being accessible only by an operating system kernel on the computing device;
store, in the register, a stack displacement value that is a difference between a base of the control stack and a base of the data stack; and
resume, in response to the return address on the data stack for the program thread matching a return address on the control stack for the program thread, execution of the program thread at the return address on the data stack upon completion of the function.

15. The computing device as recited in claim 14, the multiple instructions further causing the processor to:
read, from a storage device of the computing device, a page including binary code for the program thread;

check whether the page includes a first placeholder for a return flow guard prologue or a second placeholder for a return flow guard epilogue;

copy the page into memory;

insert return flow guard prologue code in place of the first placeholder in response to determining that the page includes the first placeholder; and insert return flow guard epilogue code in place of the second placeholder in response to determining that the page includes the second placeholder.

16. The computing device as recited in claim 15, wherein to check whether the page includes a first placeholder or a second placeholder is to check prologue offset metadata and epilogue offset metadata in the binary code for the program thread.

17. The computing device as recited in claim 15, the first placeholder comprising one or more no op instructions, and the second placeholder comprising one or more no op instructions.

18. The computing device as recited in claim 14, wherein the restricted region comprises an address space of the computing device, wherein to assign the control stack to the program thread is to allocate memory in the restricted region to the control stack, and wherein the multiple instructions further cause the processor to impose one or more properties on the restricted region, the one or more properties including:

attempts to allocate or free memory within the restricted region by other programs fail; and attempts to query the internal layout of the restricted region fail.

19. The computing device as recited in claim 18, the one or more properties further including:

attempts to access unmapped portions of the restricted region result in a fatal second chance exception;

a density of mapped pages within the restricted region does not exceed a threshold amount; and allocations of memory within the restricted region start from a random offset within the restricted region.

20. The computing device as recited in claim 14, wherein the multiple instructions further cause the processor to:

read, from a storage device of the computing device, a page including binary code for the program thread;

check whether the page includes a first placeholder for a return flow guard prologue or a second placeholder for a return flow guard epilogue;

insert, using dynamic binary translation, return flow guard prologue code in place of the first placeholder in response to determining that the page includes the first placeholder; and insert, using dynamic binary translation, return flow guard epilogue code in place of the second placeholder in response to determining that the page includes the second placeholder.

* * * * *